United States Patent
McMann

(10) Patent No.: US 11,481,539 B1
(45) Date of Patent: Oct. 25, 2022

(54) SYSTEMS AND METHODS FOR IMPROVED BUILDING OF INTERACTIVE WORKBOOKS WITHIN BUSINESS REPORTING, ANALYSIS, AND MANAGEMENT SOFTWARE

(71) Applicant: George McMann, Tyler, TX (US)

(72) Inventor: George McMann, Tyler, TX (US)

( * ) Notice: Subject to any disclaimer, the term of this patent is extended or adjusted under 35 U.S.C. 154(b) by 0 days.

(21) Appl. No.: 16/574,031

(22) Filed: Sep. 17, 2019

Related U.S. Application Data

(60) Provisional application No. 62/731,974, filed on Sep. 17, 2018.

(51) Int. Cl.
*G06F 40/14* (2020.01)
*G06F 40/18* (2020.01)
*G06F 40/177* (2020.01)

(52) U.S. Cl.
CPC ............ *G06F 40/14* (2020.01); *G06F 40/177* (2020.01); *G06F 40/18* (2020.01)

(58) Field of Classification Search
CPC ......... G06F 40/14; G06F 40/177; G06F 40/18
USPC ....................................................... 715/236
See application file for complete search history.

(56) References Cited

U.S. PATENT DOCUMENTS

| | | | | |
|---|---|---|---|---|
| 2006/0015805 A1* | 1/2006 | Humenansky | ..... | G06Q 10/0631 715/209 |
| 2006/0024653 A1* | 2/2006 | Battagin | ................. | G06F 40/18 434/350 |
| 2006/0149789 A1* | 7/2006 | Sorge | ..................... | G06F 16/258 |
| 2007/0088691 A1* | 4/2007 | Dickerman | ............. | G06F 40/18 |
| 2008/0319780 A1* | 12/2008 | Hellyer | .................. | G06Q 10/10 705/300 |
| 2011/0016379 A1* | 1/2011 | McColl | .................... | G06F 40/18 715/219 |
| 2013/0117064 A1* | 5/2013 | Sadeghi | ............. | G06Q 10/0633 705/7.27 |
| 2015/0341240 A1* | 11/2015 | Iyoob | ..................... | G06Q 40/00 709/201 |
| 2017/0046807 A1* | 2/2017 | Ford | ..................... | G06Q 10/103 |
| 2017/0235559 A1* | 8/2017 | Saenz | ....................... | G06F 8/65 717/171 |

(Continued)

OTHER PUBLICATIONS

K.S.P. Chang and B. Myers, "A Spreadsheet Model for Handling Streaming Data", Proc. 33rd ACM Conf. Human Factors in Computing Systems, pp. 3399-3402, 2015. (Year: 2015).*

(Continued)

*Primary Examiner* — Stephen S Hong
*Assistant Examiner* — Broderick C Anderson
(74) *Attorney, Agent, or Firm* — Kirby Drake

(57) ABSTRACT

Systems and methods may be provided for quickly building interactive workbooks within business reporting, analysis, and management software, particularly Microsoft Excel, that may provide self-service business intelligence to users. User interfaces and components may allow more rapid adoption of numerous existing features within Excel. Introduction of these systems and methods may significantly increase usage of features like CUBE functions by everyday Excel users. Data may be packed into a workbook within the software, particularly Excel, and can be shared with other users of the software. No client software installation may be required. Data report sharing software may refresh the data and publish workbooks automatically.

6 Claims, 8 Drawing Sheets

(56) References Cited

U.S. PATENT DOCUMENTS

2019/0012305 A1* 1/2019 Dvorak ................ G06F 16/901

OTHER PUBLICATIONS

Z. Obrenovic and D. Gasevic, "End-User Service Computing: Spreadsheets as a Service Composition Tool", IEEE Trans. Services Computing, vol. 1, No. 4, pp. 229-242, 2008. (Year: 2008).*

M. Maresca, "The Spreadsheet Space: Eliminating the Boundaries of Data Cross-Referencing," in Computer, vol. 49, No. 9, pp. 78-85, Sep. 2016, doi: 10.1109/MC.2016.272. (Year: 2016).*

* cited by examiner

FIGURE 1 (Prior Art)
Existing Cube Formulas in Excel

FIGURE 2 (Prior Art)
Existing Cube building experience in Excel

With Kick-Start!

Existing editor for Dax Expressions in Excel

With Kick-Start!

SYSTEMS AND METHODS FOR IMPROVED BUILDING OF INTERACTIVE WORKBOOKS WITHIN BUSINESS REPORTING, ANALYSIS, AND MANAGEMENT SOFTWARE

CROSS-REFERENCE TO RELATED APPLICATION

The present application is a non-provisional of and claims priority to U.S. Application No. 62/731,974 filed Sep. 17, 2018, which is incorporated by reference in its entirety.

FIELD OF THE DISCLOSURE

The present disclosure generally relates to downloadable software for use within business reporting, analysis, and management software, and more particularly, downloadable software for simplified and streamlined utilization of advanced features within business reporting, analysis, and management software.

BACKGROUND

Business reporting, analysis, and management software, more specifically, Microsoft Excel, includes various features such as user interfaces and components to programmatically generate and persist CUBEKPIMEMBER, CUBEMEMBER, CUBEMEMBERPROPERTY, CUBERANKEDMEMBER, CUBESET, CUBESETCOUNT, CUBEVALUE (referred to collectively as CUBEFORMULAS), user interfaces and components to programmatically generate and persist data analysis expressions (DAX), user interfaces and components to programmatically generate data models in Excel with pre-defined or runtime defined Measures, Relationships, and Key Performance Indicators (KPIs), and Calculated Members, and user interfaces and components to programmatically generate and persist the definitions of banded reports (reports that use row and header summarization or grouping) using a combination DAX Expressions, Slicers, Excel formulas, Excel tables, and Power Query M language. The previously mentioned Excel features do not have easy-to-use intuitive interfaces and results in limited user access to powerful business intelligence and analytical capabilities natively available in Excel. Cube formulas, especially DAX expressions, can be difficult to craft by hand, and the native user interface elements offer very little help. FIGS. 1, 2 and 4 depict existing features according to the prior art.

SUMMARY

Embodiments of the present disclosure may provide systems and methods for quickly building interactive workbooks within business reporting, analysis, and management software, particularly Microsoft Excel, that may provide self-service business intelligence to users. User interfaces and components according to embodiments of the present disclosure may allow more rapid adoption of numerous existing features within Excel. More specifically, CUBE functions have been in Excel since Excel 2007 but are still not broadly used. Introduction of systems and methods according to embodiments of the present disclosure may significantly increase usage of these features by everyday Excel users. Data may be packed into a workbook within the software, particularly Excel, and can be shared with other users of the software. No client software installation may be required in embodiments of the present disclosure. Data report sharing software may be used to refresh the data and publish workbooks automatically.

Workbooks created using systems and methods according to embodiments of the present disclosure may provide trending workbook with copy and paste, multi-million rows analysis workbook, advanced dashboards, dynamic linked tables, and power view.

Systems and methods according to embodiments of the present disclosure may work in Excel Online and/or in Excel for mobile devices. Advanced dashboards may be provided as well as advanced interactive financial statements. Reporting according to embodiments of the present disclosure may permit modification of templates, existing workbooks may be ported, and/or new workbooks may be created using designer tools for Excel through systems and methods according to embodiments of the present disclosure. Data refresh and run-time parameters may be scheduled with data report sharing software, which may then be directed to deliver workbooks with current data to users via one or more methods including, but not limited to, email, FTP, Dropbox and/or OneDrive. Accordingly, workbooks may be used by any Excel user.

BRIEF DESCRIPTION OF THE DRAWINGS

For a more complete understanding of this disclosure, reference is now made to the following description, taken in conjunction with the accompanying drawings, in which:

FIG. 1 depicts existing CUBE formulas in Excel according to the prior art;

FIG. 2 depicts existing an CUBE-building experience in Excel according to the prior art;

DETAILED DESCRIPTION

Figure 3:
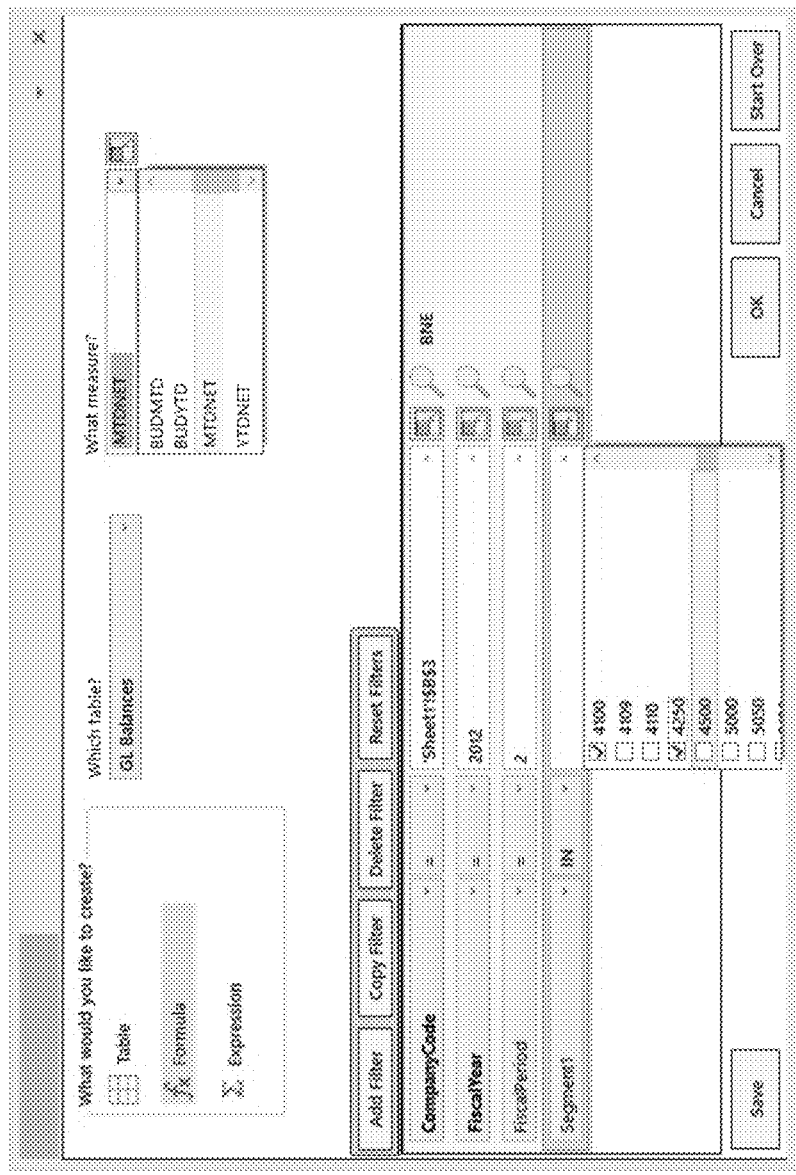
FIG. 3 depicts creation of a formula according to an embodiment of the present disclosure.
Figure 4:
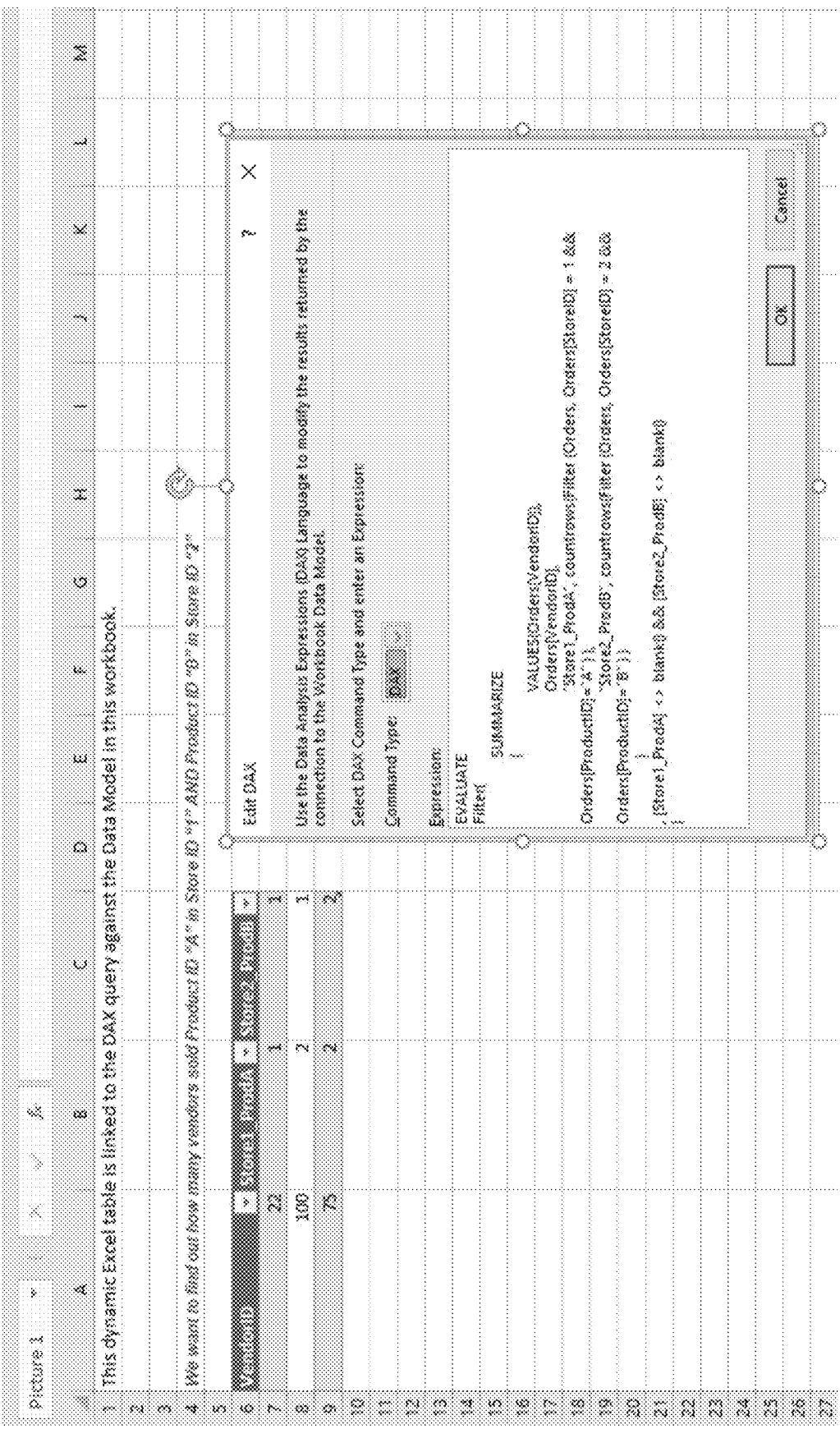
FIG. 4 depicts an existing editor for DAX expressions in Excel according to the prior art.

Embodiments of the present disclosure may provide the ability to easily connect an Excel® workbook to a cloud data model for a business intelligence tool, such as Microsoft® Power BI®. This ease of connection may open the door to use of Excel as a true self-service business intelligence platform. As described herein, systems may be utilized to load user's relevant business data into one or more Data Models.

Every company in the Excel reporting space is broken down into two categories: cell-based data retrieval and reporting, and set-based data retrieval and reporting. Cell-based reporting can be a great fit for financial reporting (Income Statements, Balance Sheets, Cash Flow, and others) but is challenged with performance when many formulas need to be calculated. To address the performance issues, all major software vendors retrieve blocks or even replicate sets of data from the business software's database and cache the data locally for faster calculations. For example, F9 uses a local Pervasive database that each user must install. Spreadsheet Server uses a local Access database that each user must install. In contrast, systems and methods according to embodiments of the present disclosure, an in-memory data engine may install when the Excel® Add-In is installed. Each vendor may have one or more user defined functions (UDF) that may be used in the Excel® workbook to retrieve data from the cached data and shows the result in the current cell where the UDF is used.

Systems and methods according to embodiments of the present disclosure may use the Microsoft® In-Memory data engine (called the Data Model) which is included and native to recent versions of Excel® (since Excel 2010.) This in-memory engine is incredibly powerful and amazingly fast. It has been tested on Excel workbooks with 50,000,000 rows of data and can get a fast response time, such as under approximately 20 seconds, on re-calculating the workbook. None of the vendors in this space can even come close to doing something like this. Instead of using a proprietary UDF to return the data, systems and methods according to embodiments of the present disclosure may use native Excel functions to return the data, like CUBEVALUE( ) and CUBESET( ). These are very powerful and fast functions in Excel to return data from the Data Model. To ensure that the data that the customer needs to see and report on is available, the proper data model must be designed and loaded with data from the enterprise resource planning (ERP) business transaction system (on-premises or cloud), a customer relationship management (CRM), and/or other business software systems. Spreadsheets and reports built with designer tools according to embodiments of the present disclosure may therefore be totally usable by any user with Excel, unlike the products in this space now which are all proprietary. All of the workbooks created using the software products in this space are only usable by other Excel users who have the software vendor's product installed on their computers. If you attempt to open the workbook without the proper software installed you will get an Excel error (#Name in the cell). The software vendors in this space address this issue by having various tools to save the spreadsheet in a format that can be shared with non-product users (like export to .PDF, or save the workbook with values instead of formulas that use the UDF functions). These export options severely limit the value of the spreadsheet (i.e. static values, no end user interaction (like changing values, using slicers to select different criteria, etc.), and they cannot be refreshed with data from the connected integrated ERP system, CRM, and/or other business software systems. With systems and methods according to embodiments of the present disclosure, none of these restrictions apply. Since the Kick-Start! finished workbooks are native Excel .xlsx files, they can be easily used by many more people than the products currently in this space.

Systems and methods according to embodiments of the present disclosure may provide a software utility that can open an Excel workbook and inspect it for User Defined Functions. When it finds a UDF, it may generate a CUBEVALUE( ) function that is equivalent to the UDF. This means that the new CUBEVALUE( ) function returns the same answer as the UDF (of course, this requires that the proper data model exists in the workbook. To complete a migration, data models may be designed for F9 and Spreadsheet Server.) This allows for efficient and quick workbook migration from not only the Excel Add-In, but also from F9, Spreadsheet Server and any other cell-based UDF Excel reporting software. A migration like this could easily increase the performance of the old workbook by a significant amount, alleviate the requirement to have local cached data other than a local embedded Data Model, and the new workbook can be used by any Excel user. However, it should be appreciated that there may be embodiments of the present disclosure where there may be a local client install for each user without departing from the present disclosure.

Systems and methods according to embodiments of the present disclosure may provide technology that operates faster, can handle way more data, and in some embodiments of the present disclosure, no install may be needed to share the workbooks. And this technology has additional features not available in current products.

Set-based (or table-based) advanced reporting capabilities may be provided that leverage the Data Model as well. This takes more coding and testing to develop this user interface than the UI for cell-based CUBE . . . ( ) functions. With the CUBE . . . ( ) functions, the existing formula editor functions may be ported over to CUBE . . . ( ) functions very quickly. The Table designer UI also may be ported. The drill-down add-in also may be ported to work with the data model. The drill-down add-in may allow the user to drill-down to various levels of detail from a summary number (something not available in native Excel). Most products in this space have some type of end user drill-down capability. These two Excel UI add-ins greatly help the Excel user create reports and tables from the data in the Excel data model. The built-in tools for getting data out of the Data Model are limited and very complex to use. But, as stated earlier, once the user completes the creation of the Excel workbook using these UI tools, in some embodiments of the present disclosure, the resulting workbook is native Excel and can be viewed and interacted with by any Excel user (versions 2010 and above.)

Figure 5A:
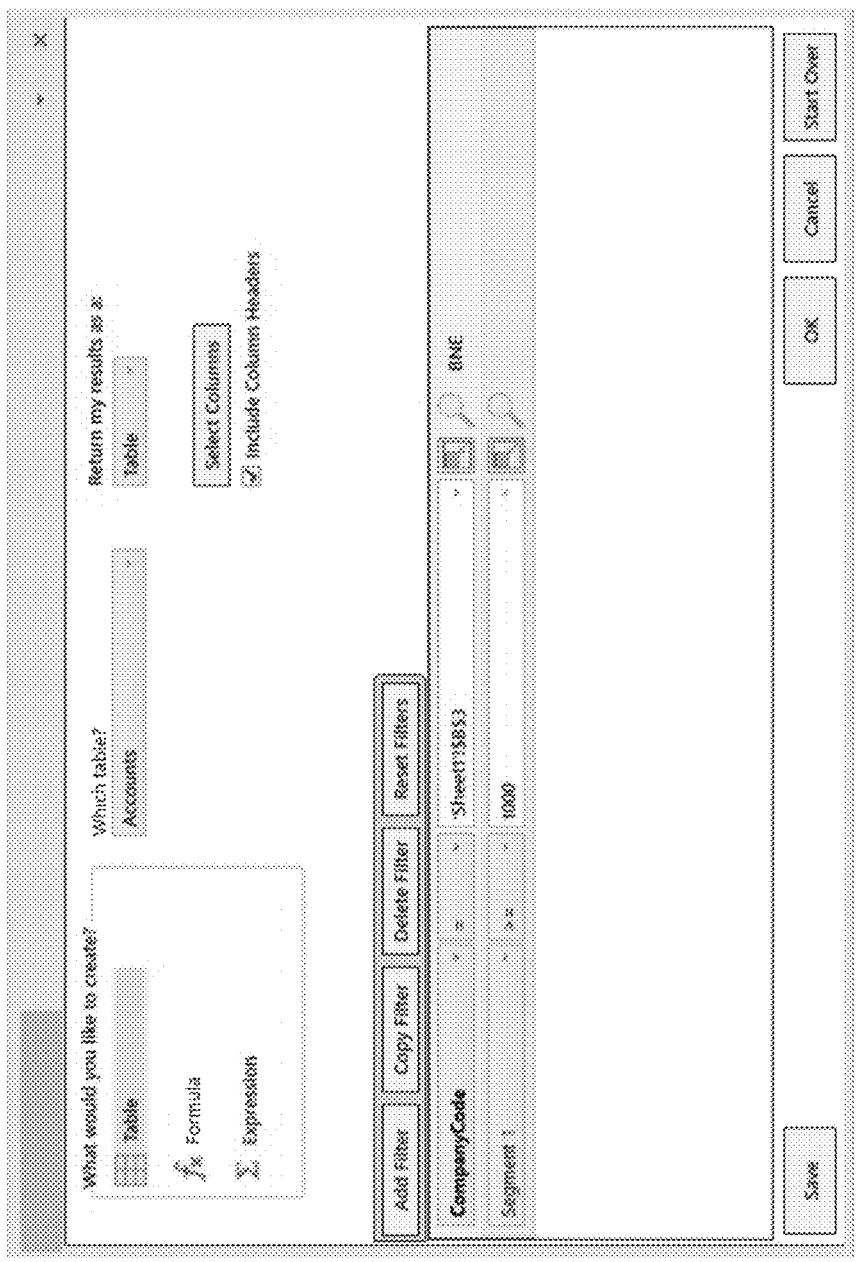
FIGS. 5A-5C depict table creation according to an embodiment of the present disclosure.
Figure 5B:
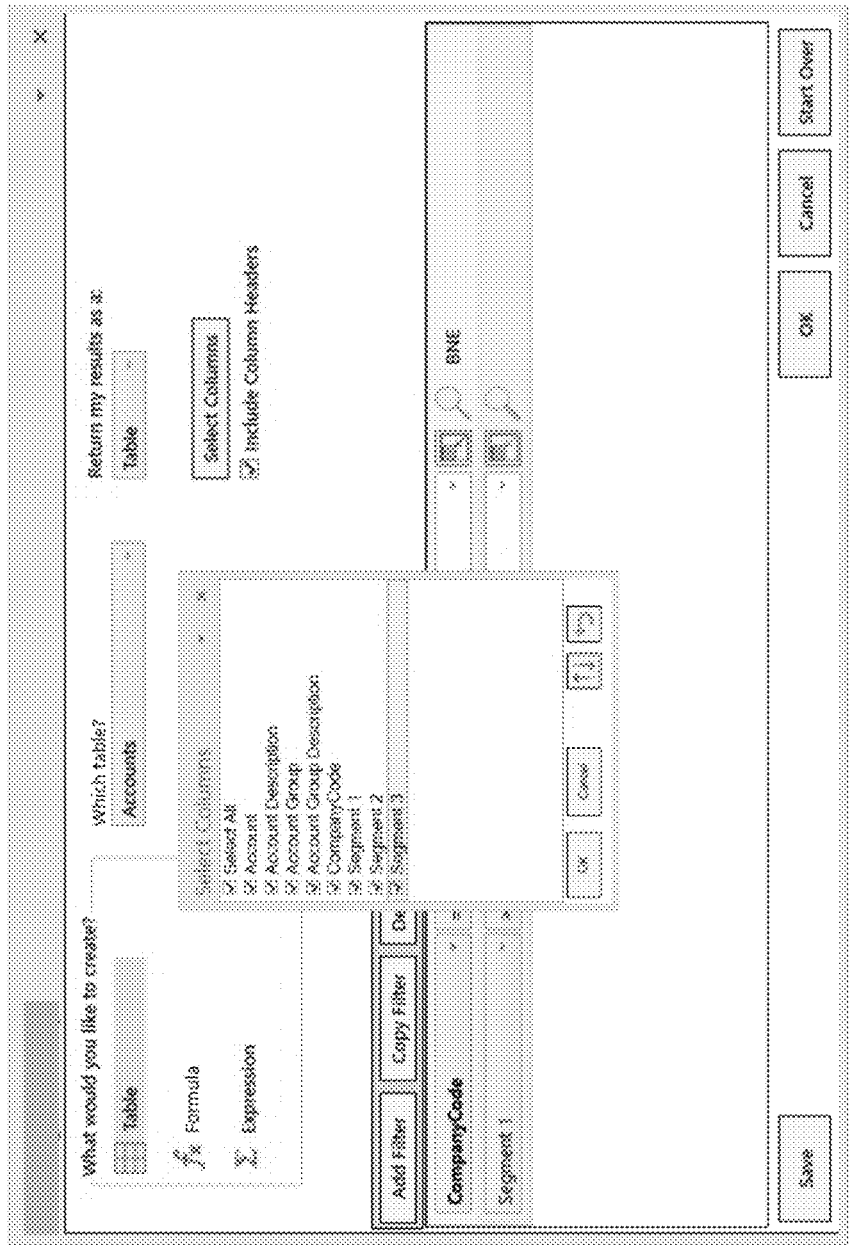
Figure 5C:
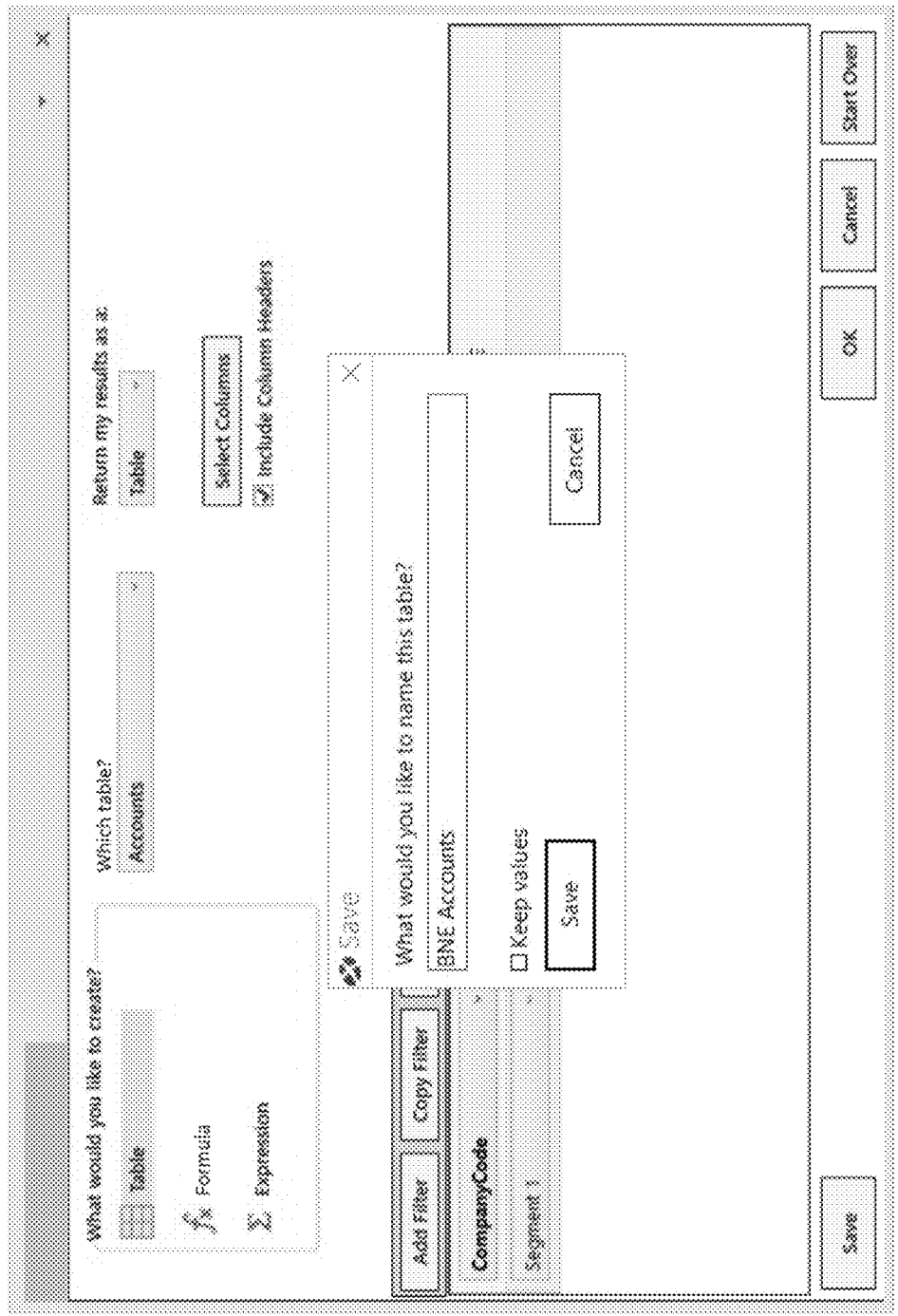
Figure 6A:
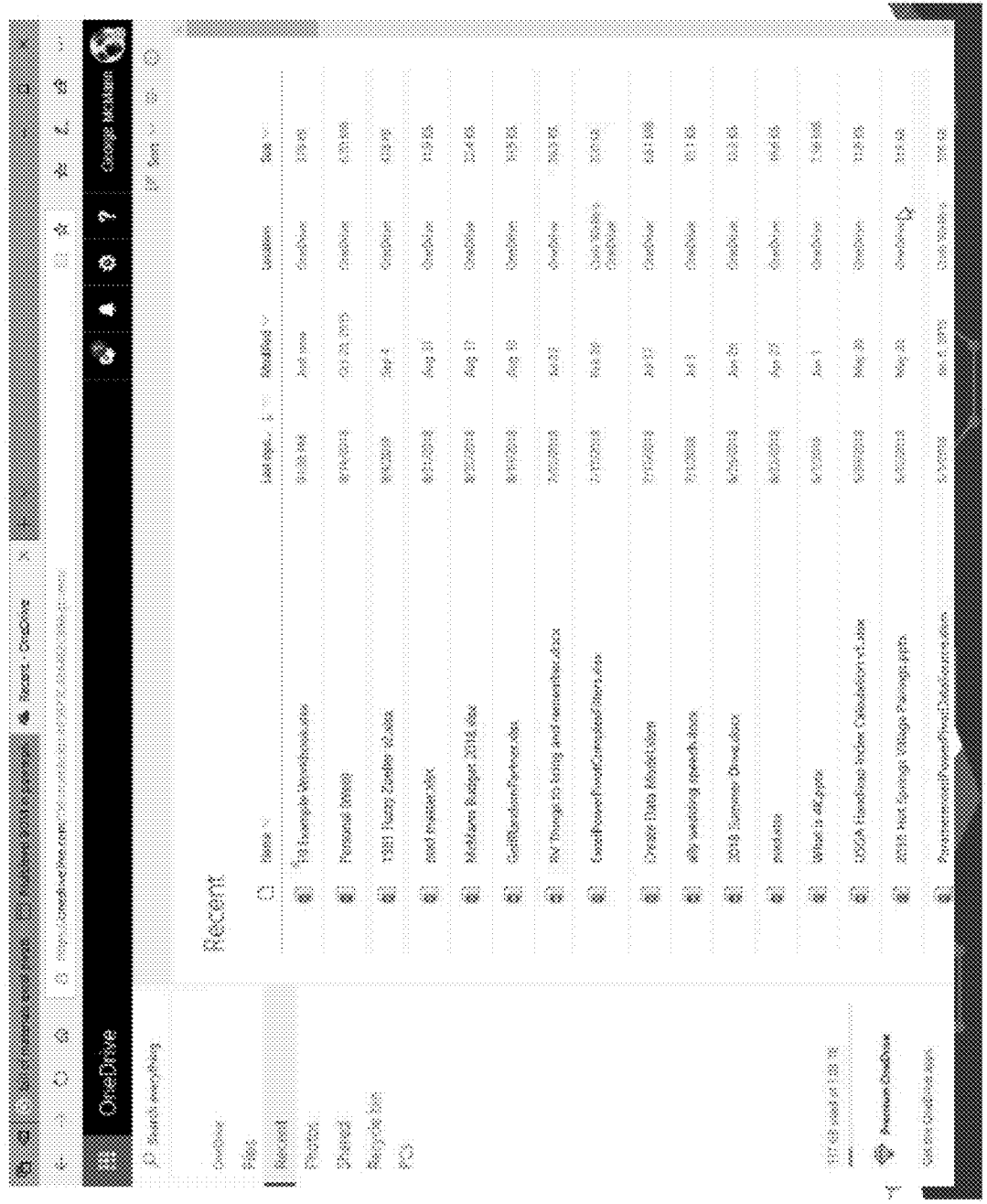
FIGS. 6A-6B depicts screen shots of systems and methods according to an embodiment of the present disclosure.
Figure 6B:
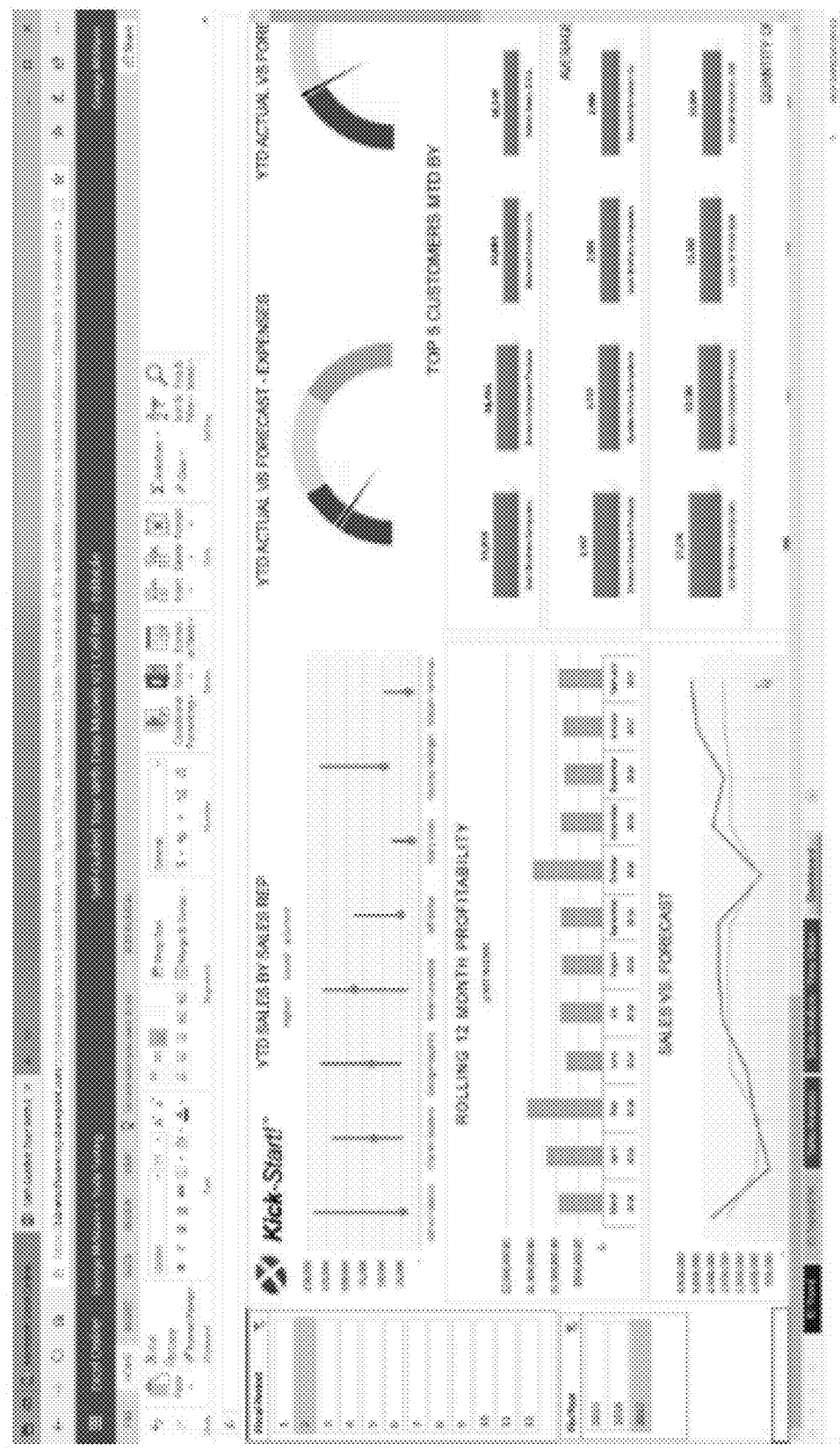

FIGS. 3, 5A-5C, and 6A-6B depict screen shots of a user interface and components of systems and methods according to embodiments of the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for simplified and streamlined utilization of advanced features within business reporting, analysis, and management software comprising:
   connecting a spreadsheet workbook to a cloud in-memory data engine Data Model of the business reporting, analysis, and management software;
   using the spreadsheet workbook as a self-service business intelligence platform, wherein business data is loaded into the Data Model from each of an enterprise resource planning (ERP) business transaction system, a customer relationship management (CRM), and other business software systems;
   refreshing the business data loaded into the Data Model;
   returning the business data from the Data Model using functions native to the spreadsheet workbook; and
   publishing the spreadsheet workbook automatically.

2. The method of claim 1, wherein the business data is shareable with other users of the business reporting, analysis, and management software.

3. The method of claim 1, wherein no client software installation is utilized.

4. The method of claim 1, wherein the spreadsheet workbook provides a trending workbook with copy and paste, multi-million rows analysis workbook, advanced dashboards, dynamic linked tables, and power view.

5. The method of claim 1, wherein the self-service business intelligence platform performs one or more of the following steps:
- modifying templates;
- porting one or more existing spreadsheet workbooks; and
- creating one or more new spreadsheet workbooks.

6. The method of claim 1 further comprising:
- re-calculating the spreadsheet workbook; and
- using one or more functions native to the spreadsheet workbook, receiving a response from the Data Model in under 20 seconds.

\* \* \* \* \*